J. W. WILSON.
Bolts for Middlings-Purifiers.

No. 152,312.　　　　　　　　　　　　　　Patented June 23, 1874.

WITNESSES:　　　　　　　　　　　　　　INVENTOR:

UNITED STATES PATENT OFFICE.

JOSEPH W. WILSON, OF WARSAW, ILLINOIS.

IMPROVEMENT IN BOLTS FOR MIDDLINGS-PURIFIERS.

Specification forming part of Letters Patent No. 152,312, dated June 23, 1874; application filed May 9, 1874.

*To all whom it may concern:*

Figure 1:
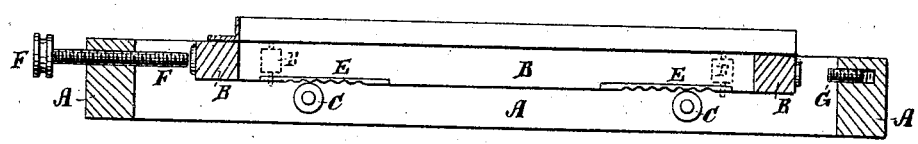
Figure 2:
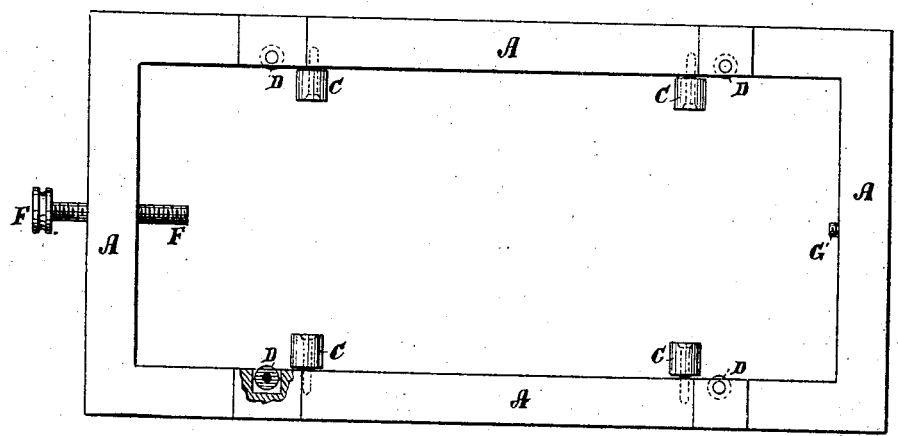
Figure 3:
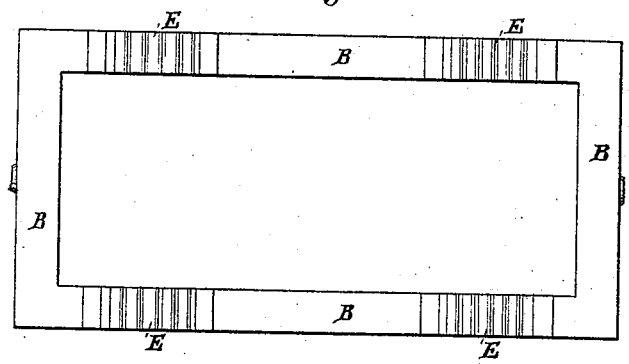

Be it known that I, JOSEPH W. WILSON, of Warsaw, in the county of Hancock and State of Illinois, have invented a new and useful Improvement in Bolt or Screen for Middlings-Purifiers, of which the following is a specification:

Figure 1 is a longitudinal section of my improved bolt or screen. Fig. 2 is a top view of the outer or larger frame. Fig. 3 is an underside view of the inner or smaller frame.

Similar letters of reference indicate corresponding parts.

My invention has for its object to furnish an improved bolt or screen for the class of middlings-purifiers that use a flat screen, and which shall be so constructed as to keep the screen-cloth clean, and the middlings thoroughly agitated, increasing the capacity of the bolt or screen, and enabling a much finer screen-cloth to be used. The invention consists in the combination of the outer frame, provided with the rollers and one or both the set-screws, with the inner frame, to which the bolt-cloth is attached, provided with the corrugated plates, as hereinafter fully described.

A is a frame of suitable size, and which is placed upon or hung by springs, and vibrated or reciprocated by a crank or eccentric in the usual way. B is a frame placed within the frame A, and made of such a width as to fit between the side bars of the frame A. The frame B is made shorter than the frame A, so that it may have a longitudinal movement within said frame. To the lower part of the inner sides of the side bars of the frame A are pivoted small horizontal rollers C, upon which the side bars of the frame B rest. In recesses in the inner sides of the side bars of the frame A are pivoted small vertical rollers D, the sides of which project to bear against the side bars of the frame B, to keep the said frame B in line, and prevent it from binding. To the under side of the parts of the side bars of the frame B that rest upon the rollers C are attached corrugated plates E, which, as the frame B vibrates or reciprocates, give to the said frame B a slight up-and-down movement. F is a set-screw, which passes in through the end bar of the frame A, for the end of the frame B to strike against, to limit its movement. To the other end bar of the frame A is attached a set or stop screw, G, for the other end of the frame B to strike against. The screw F should be provided with a lock-nut, to prevent it from being jarred out of place by the pounding of the frame B. Screws or plates should be attached to the ends of the frame B, to strike against the screws F G, to prevent the said frame from being injured by said screws. To the frame B is attached the bolt-cloth and a flange, to keep the middlings from passing off at its sides and the wrong end. By this construction the slight up-and-down movement and the jar of the frame B keep the bolt-cloth clean, and enable a much finer bolt-cloth to be used than would otherwise be possible, thus increasing the capacity of the bolt, and causing it to do better work.

Having thus described my invention, I claim as new, and desire to secure by Letters Patent—

The combination of the outer frame A, provided with the rollers C D and set-screws F G, one or both, with the frame B, to which the bolt-cloth is attached, provided with the corrugated plates E, substantially as herein shown and described.

JOSEPH W. WILSON.

Witnesses:
J. BREITENSTEIN,
WM. BREITENSTEIN.